(12) United States Patent
Myers et al.

(10) Patent No.: US 9,921,608 B2
(45) Date of Patent: Mar. 20, 2018

(54) ELECTRONIC DEVICE WITH WRAPPED DISPLAY

(71) Applicant: Apple Inc., Cupertino, CA (US)

(72) Inventors: Scott A. Myers, San Francisco, CA (US); Derek Wright, San Francisco, CA (US); Fletcher R. Rothkopf, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 52 days.

(21) Appl. No.: 14/866,590

(22) Filed: Sep. 25, 2015

(65) Prior Publication Data

US 2016/0018852 A1 Jan. 21, 2016

Related U.S. Application Data

(63) Continuation of application No. 13/494,472, filed on Jun. 12, 2012, now Pat. No. 9,429,997.

(51) Int. Cl.
*G06F 1/16* (2006.01)
*G06F 3/0488* (2013.01)
(Continued)

(52) U.S. Cl.
CPC .......... *G06F 1/1652* (2013.01); *G06F 1/1656* (2013.01); *G06F 1/1694* (2013.01);
(Continued)

(58) Field of Classification Search
None
See application file for complete search history.

(56) References Cited

U.S. PATENT DOCUMENTS 6,630,922 B2 * 10/2003 Fishkin .................. G06F 1/16
                                                          345/156
6,804,905 B1 10/2004 Burger, III et al.
(Continued)

FOREIGN PATENT DOCUMENTS

EP 2187601 5/2010
EP 2192750 6/2010
(Continued)

*Primary Examiner* — Joseph Haley
*Assistant Examiner* — Emily Frank
(74) *Attorney, Agent, or Firm* — Treyz Law Group, P.C.; G. Victor Treyz; Zachary D. Hadd

(57) ABSTRACT

An electronic device may have a hollow display cover structure. The hollow display cover structure may be formed from a structure having an inner surface. The structure may be an elongated member having a longitudinal axis. A material such as sapphire, other crystalline materials, or other transparent materials may be used in forming the hollow display cover structure. A flexible display layer such as an organic light-emitting diode display layer or other flexible display structure may be wrapped around the longitudinal axis to cover the interior surface of the hollow display cover structure. The electronic device may have a touch sensor, accelerometer, gyroscope, and other sensors for gathering input such as user input. The electronic device may use one or more sensors to gather information on rotational motion of the device and can display content on the flexible display layer accordingly.

19 Claims, 23 Drawing Sheets

(51) Int. Cl.
    *G06F 3/0485* (2013.01)
    *G06F 3/0487* (2013.01)

(52) U.S. Cl.
    CPC .......... *G06F 3/0485* (2013.01); *G06F 3/0487* (2013.01); *G06F 3/0488* (2013.01); *G06F 2203/04102* (2013.01)

(56) References Cited

U.S. PATENT DOCUMENTS

| | | | |
|---|---|---|---|
| 7,463,238 B2 | 12/2008 | Funkhouser et al. | |
| 7,710,370 B2 | 5/2010 | Slikkerveer et al. | |
| 8,665,236 B2 | 3/2014 | Myers et al. | |
| 8,824,140 B2 | 9/2014 | Prest et al. | |
| 2003/0060269 A1 | 3/2003 | Paulsen et al. | |
| 2005/0040962 A1 | 2/2005 | Funkhouser et al. | |
| 2006/0007368 A1 | 1/2006 | Slikkerveer et al. | |
| 2007/0247439 A1 | 10/2007 | Daniel et al. | |
| 2008/0158173 A1 | 7/2008 | Hamblin et al. | |
| 2009/0219225 A1 | 7/2009 | Cope | |
| 2009/0270142 A1* | 10/2009 | Liang .................... | G06F 1/1626 455/575.1 |
| 2010/0117975 A1* | 5/2010 | Cho ....................... | G06F 1/1626 345/173 |
| 2010/0182518 A1 | 7/2010 | Kirmse | |
| 2010/0216514 A1* | 8/2010 | Smoyer ................. | G06F 1/1647 455/566 |
| 2011/0068999 A1 | 3/2011 | Street | |
| 2011/0187681 A1 | 8/2011 | Kim et al. | |
| 2011/0199286 A1 | 8/2011 | Dizama | |
| 2011/0261002 A1* | 10/2011 | Verthein ................. | G06F 1/181 345/174 |
| 2012/0212890 A1 | 2/2012 | Hoshino et al. | |
| 2012/0243151 A1 | 9/2012 | Lynch | |
| 2013/0063891 A1* | 3/2013 | Martisauskas ........ | G06F 1/1643 361/679.56 |
| 2013/0279088 A1* | 10/2013 | Raff ....................... | G06F 1/1637 361/679.01 |
| 2015/0169002 A1* | 6/2015 | Kemppinen .......... | G06F 1/1643 361/679.55 |

FOREIGN PATENT DOCUMENTS

| | | |
|---|---|---|
| JP | 2007072375 | 3/2007 |
| KR | 10-2004-0090463 | 10/2004 |
| KR | 10-2010-0052227 | 5/2010 |
| WO | 2011114190 | 9/2011 |

* cited by examiner ns application is a continuation of U.S. patent application Ser. No. 13/494,472, filed Jun. 12, 2012, which is hereby incorporated by reference herein in its entirety. This application claims the benefit of and claims priority to U.S. patent application Ser. No. 13/494,472, filed Jun. 12, 2012.

ELECTRONIC DEVICE WITH WRAPPED DISPLAY

BACKGROUND

This relates to electronic devices, and more particularly, to electronic devices with displays.

Electronic devices such as computers, media players, and cellular telephones typically contain displays. For example, an electronic device may have a front surface on which a display is mounted. Conventional display configurations such as these may be satisfactory in certain situations, but can be unnecessarily limiting.

It would therefore be desirable to provide electronic devices with improved displays.

SUMMARY

An electronic device may have a hollow display cover structure. The hollow display cover structure may be formed from an elongated member having an inner surface. The hollow display cover structure may have the shape of a hollow cylinder, a hollow tube with an oval, triangular, or rectangular cross-sectional shape, or other hollow shapes. A material such as sapphire, other crystalline materials, or other transparent materials may be used in forming the hollow display cover structure. End caps may be attached to opposing ends of the hollow display cover structure.

The elongated display cover structure may have a longitudinal axis. A flexible display layer such as an organic light-emitting diode display layer or other flexible display structure may be wrapped around the longitudinal axis to cover the interior surface of the hollow display cover structure. The flexible display layer may have edges that abut without overlapping, may have overlapping edges, or may have edges that protrude through an opening in a support structure along a seam.

The electronic device may have a touch sensor, accelerometer, gyroscope, and other sensors for gathering input such as user input. The electronic device may, for example, use one or more sensors to gather information on rotational motion of the device about the longitudinal axis, tilt events, and other motion of the electronic device. In response to detection of these device motions, the electronic device can display content on the flexible display layer.

The device may display content that moves or that remains at a fixed location on the surface of the flexible display layer. For example, the electronic device may display pages of content on the display layer in response to tilt events or other motions of the device. The electronic device may also adjust scrolling activity and other on-screen content motions based on detected device rotation and other measured movement of the device. If desired, content can be displayed in synchronization with the rotation of the electronic device about the longitudinal axis so that the displayed content remains at a fixed location relative to a user. Content may be simultaneously displayed at a fixed location on the surface of the display. In response to detection of a vertical device orientation in which the longitudinal axis is vertical, the device may automatically scroll content on the display around the longitudinal axis.

Further features of the invention, its nature and various advantages will be more apparent from the accompanying drawings and the following detailed description of the preferred embodiments.

DETAILED DESCRIPTION

Figure 1:
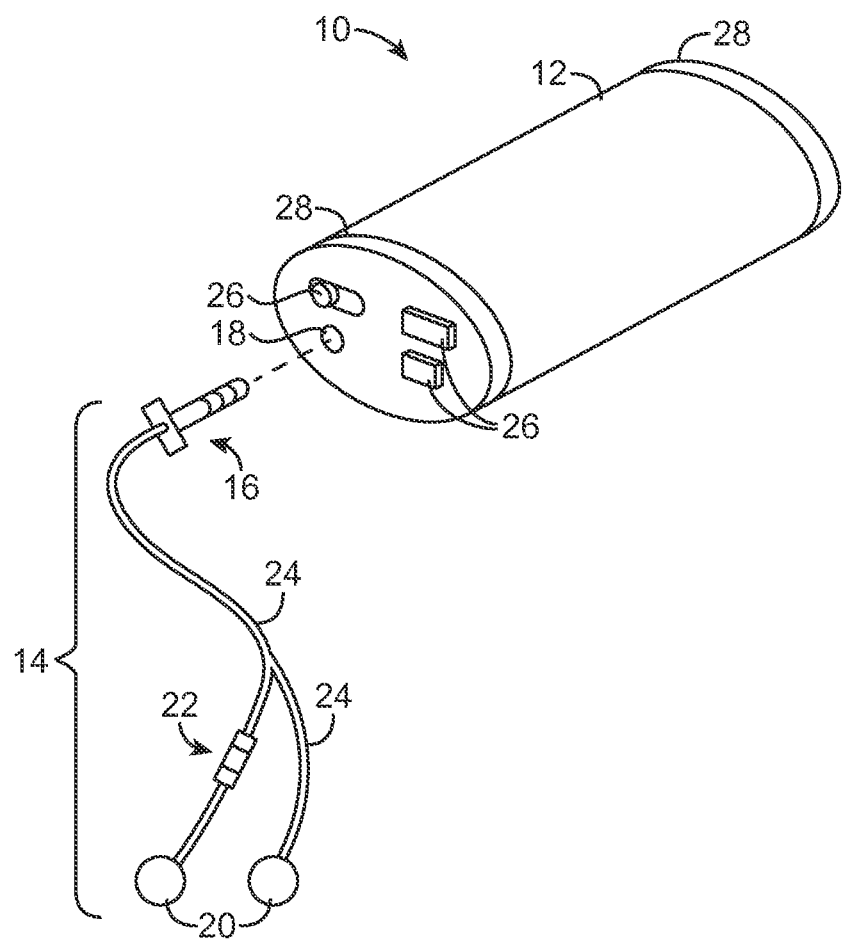
FIG. 1 is a diagram of a system including an electronic device with a continuously wrapped display in accordance with an embodiment of the present invention.

An illustrative system that includes an electronic device with a wrapped display is shown in FIG. 1. As shown in FIG. 1, device 10 may have a display such as display 12 that is continuously wrapped around the body of device 10. Displays such as display 12 may be formed using liquid crystal display (LCD) technology, a light-emitting display such as an organic light-emitting diode display, an electrophoretic display, an electrowetting display, a plasma display, or other suitable types of display technology.

In the example of FIG. 1, the housing of device 10 has an elongated shape with an oval cross-sectional shape. This is merely illustrative. Other types of housings may be used for device 10 if desired.

As shown in FIG. 1, electronic device 10 may be coupled to an accessory such as headset 14 by plugging plug 16 of accessory 14 into jack 18 of electronic device 10.

Electronic device 10 may be a computer such as a desktop computer, tablet computer, or laptop computer. Device 10 may also be a handheld electronic device such as a cellular telephone or media player, a tablet device, other portable electronic devices, or other electronic equipment. Headset 14 may have speakers 20 and controller 22. Controller 22 may have buttons and may therefore sometimes be referred to as a button controller or button controller assembly. Button controller 22 and speakers 20 may be coupled to device 10 using cable 24. Cable 24 may contain multiple wires. Button controller 22 may, if desired, include a microphone. The microphone may be used by a user of device 10 and headset 14 during a telephone call (e.g., to pick up the user's voice).

Device 10 may have opposing end faces such as end faces 28. End faces 28 may be associated with plastic cap structures or other types of housing structures. Device 10 may have input-output components such as buttons and switches 26 that are mounted to end face structures 28. Components 26 may also include status indicator lights, microphone ports, speaker ports, connector ports in addition to audio jack port 18, sensors such as an ambient light sensor and proximity sensor, and other electrical components.

Figure 2:
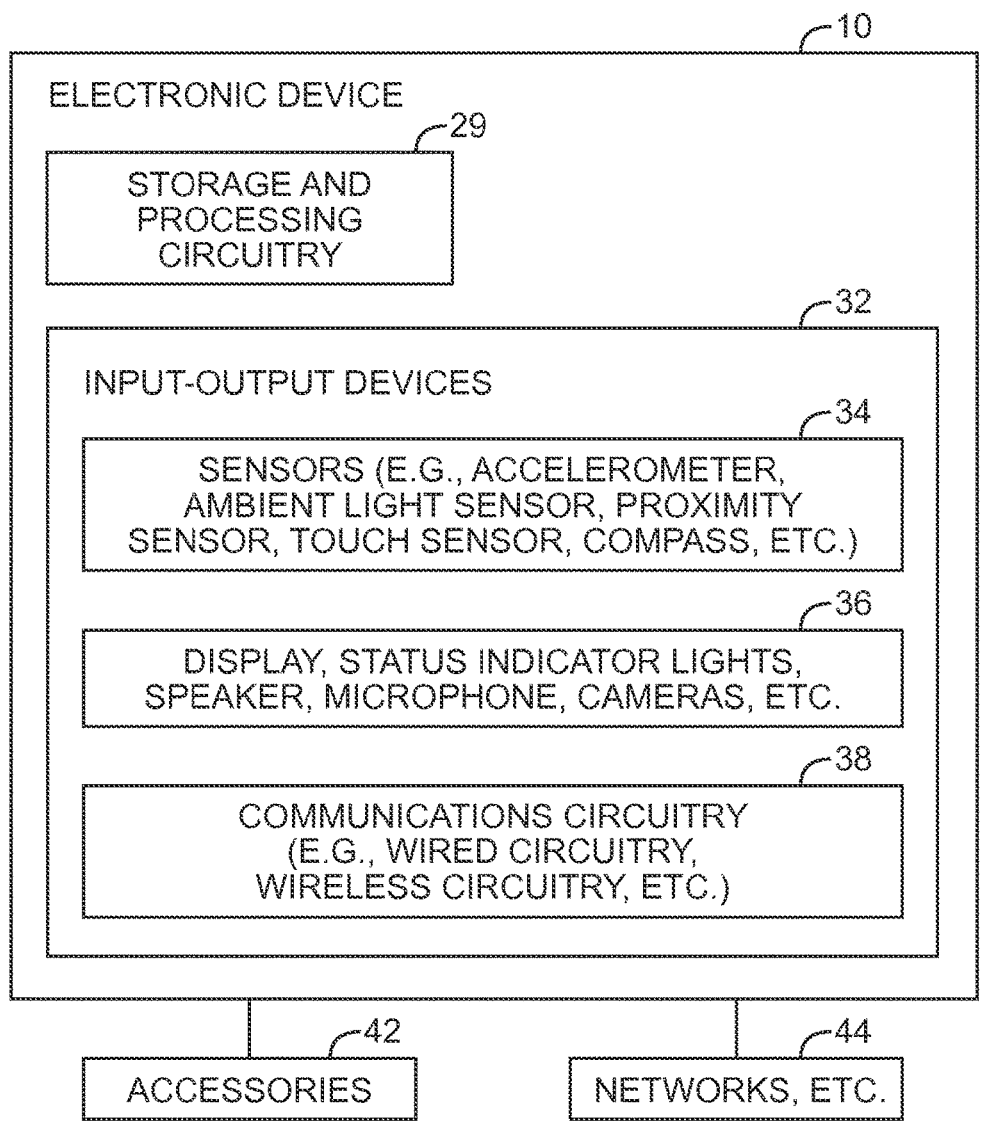
FIG. 2 is a schematic diagram of an electronic device of the type shown in FIG. 1 in accordance with an embodiment of the present invention.

A schematic diagram showing illustrative circuitry that may be included in device 10 is shown in FIG. 2. As shown in FIG. 2, electronic device 10 may include control circuitry such as storage and processing circuitry 29. Storage and processing circuitry 29 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 29 may be used to control the operation of device 10. The processing circuitry may be based on one or more microprocessors, microcontrollers, digital signal processors, baseband processors, power management units, audio codec chips, application specific integrated circuits, etc.

Input-output devices 32 may include sensors such as sensors 34. Sensors 34 may include sensors such as ambient light sensors, touch sensors, accelerometers, and proximity sensors, touch screen sensor arrays (e.g., capacitive touch sensors, touch sensors based on resistive touch sensor technology, acoustic touch technology, light-based touch technology, or other touch sensors), and other sensors.

Input-output devices may also include devices 36 such as audio input-output devices (e.g., microphones and speakers), device such as buttons, joysticks, click wheels, scrolling wheels, touch pads, key pads, keyboards, tone generators, vibrators, cameras, status indicators such as light-emitting diodes, etc. Devices 36 may also include one or more displays such as display 12 of FIG. 1.

Communications circuitry 38 may include wired data port circuitry and wireless communications circuitry. The wireless communications circuitry may include radio-frequency (RF) transceiver circuitry formed from one or more integrated circuits, power amplifier circuitry, low-noise input amplifiers, passive RF components, one or more antennas, and other circuitry for handling RF wireless signals. Wireless signals can also be sent using light (e.g., using infrared communications).

Electronic device 10 may interact with external equipment. For example, electronic device 10 may send data to external equipment 44 and may receive data from external equipment 44. External equipment 44 may include a wireless local area network that communicates wirelessly with device 10 using communications circuitry 38 in device 10, may be wired network equipment to which device 10 is attached with a cable, may be a peer device that is coupled to device 10 through a wired or wireless connection, or may be other equipment that sends and/or receives signals from device 10.

Electronic device 10 may also interact with equipment such as accessories 42 using a wired path and/or wireless path. For example, accessories 42 may include a headset with an audio plug that is configured to mate with an audio jack in device 10. Accessories 42 may also include microphones, speakers, and other audio accessories, video accessories, televisions, computer monitors, charging stations, display equipment, embedded system equipment such as equipment in an automobile, and other external electronic equipment. Analog and/or digital communications may be used in communicating between device 10 and accessories 42.

Figure 3:
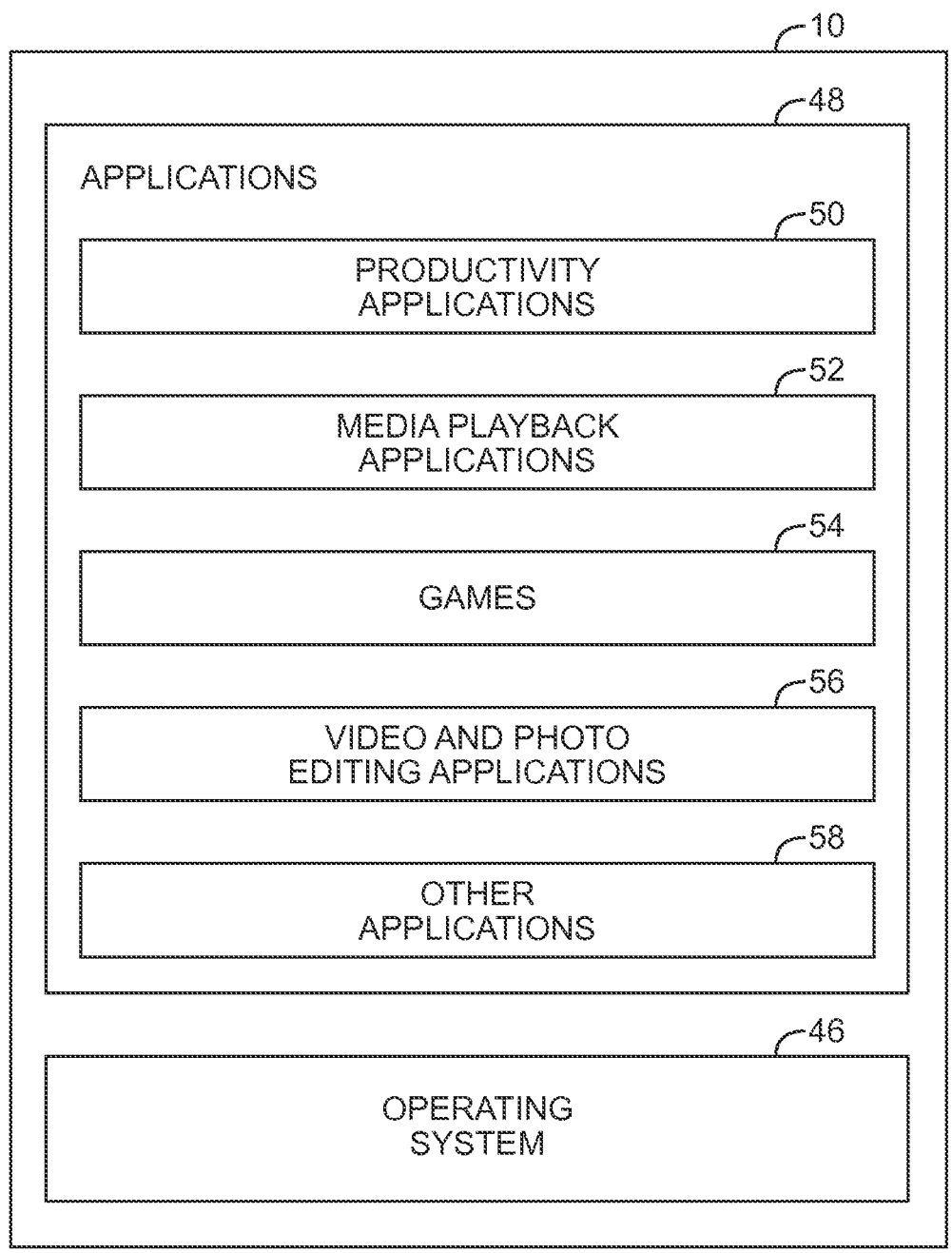
FIG. 3 is a diagram of illustrative software that may be implemented on control circuitry of the type shown in FIG. 2 in accordance with an embodiment of the present invention.

Device 10 may use software for implementing functions that display information on display 12 and other device functions. The software may be implemented on control circuitry such as storage and processing circuitry 29 of FIG. 2. As shown in FIG. 3, software that may be implemented on device 10 may include operating system 46 and applications 48. Applications 48 may include productivity applications 50 such as word processing applications, document management applications, applications for viewing and editing Portable Document Format files, applications for viewing presentations, and spreadsheet applications. Applications 48 may also include media playback applications such as video applications, electronic book readers, and applications for playing audio files (e.g., with the simultaneous display of cover art, lyrics, and other associated information). Applications 48 may include games 54, video and photo editing applications 56, and other applications 58. Games 54 may include games with static image content such as word games and moving images (video) such as action games. Editing applications 56 may be used to edit videos, to edit digital photographs, and to edit other digital imaging data. Applications 58 may include applications for displaying stock prices and other financial data, applications for displaying reviews, applications for displaying travel information, applications for displaying weather information, and other applications.

When running application and operating system software such as applications 48 and operating system 46, device 10 may gather user input from a touch screen, keyboard, touch pad, voice recognition function, or other user input resources and may provide a user of device 10 with audio output using speakers or other audio equipment. Visible output may be displayed for the user with display 12 using applications 48 and/or operating system 46. The visible output that is displayed for the user may include static content and or moving content. Displayed content may include still and/or moving images such as digital image data, video, graphics, text, game output, etc.

In some applications, content may be displayed on display 12 in a wrapped fashion (i.e., using an approach that takes advantage of the wrapped display shape of display 12). For example, content may be displayed on display 12 that circulates around display 12 continuously, as with a scrolling stock ticker. As another example, game content may be displayed for a user that continually updates in response to rotational motion of device 10 as a user rotates display 12 (and device 10).

Display 12 may, if desired, have a display cover structure. The display cover structure may be formed from a transparent material with a hollow shape. As an example, the display cover structure may have the shape of an elongated hollow structure such as a hollow cylinder or a hollow tube with a non-circular cross-sectional shape. A flexible display layer may be mounted on the inner surface of the hollow display cover structure. For example, a flexible display layer may be attached to an inner surface of a hollow display cover structure using adhesive.

A display cover structure may be formed from a transparent material such as clear glass (e.g., borosilicate glass, fused silica, etc.), transparent plastic, clear ceramic (e.g., aluminum oxynitride), etc. With one illustrative arrangement, which may sometimes be described herein as an example, display cover structures may be formed from a transparent crystalline material such as sapphire (aluminum oxide), zirconium dioxide, or other materials that are clear and hard. An advantage of materials of this type is that they may exhibit elevated hardness values (e.g., values of 9 Mohs, 7 Mohs or above, 8 Mohs or above, or other values above 6 Mohs, which is typical for borosilicate glass).

Figure 4:
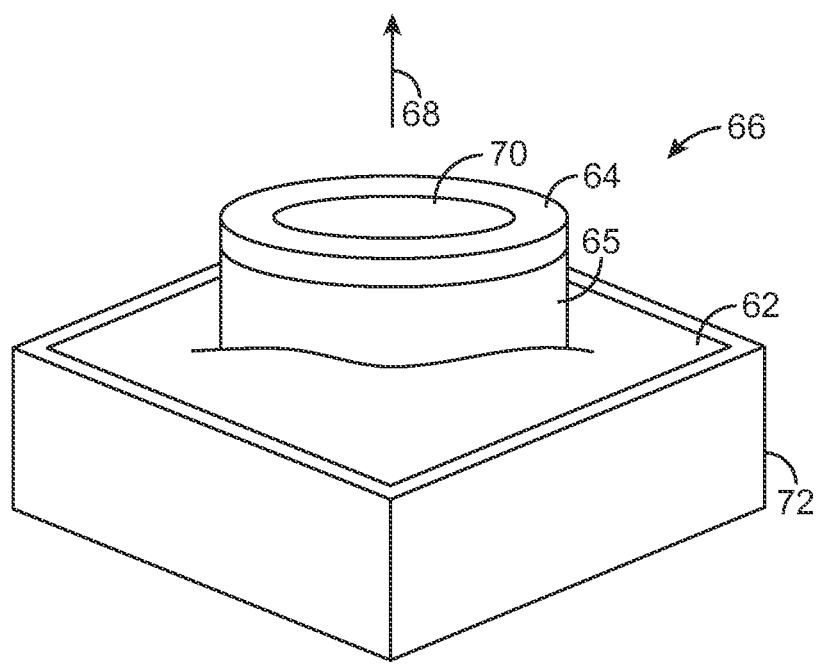
FIG. 4 is a perspective view of a transparent housing structures being grown from a molten material by pulling a seed crystal vertically upwards in accordance with an embodiment of the present invention.

Sapphire display cover structures may be grown as single crystals by pulling a boule of sapphire from a melt. This type of arrangement is shown in FIG. 4. Crucible 72 may be filled with alumina powder, which is raised to a sufficient temperature to form a molten liquid (melt 62). Single-crystal seed 64 may then be pulled upwards in direction 68. As seed crystal 64 moves upwards, the material in melt 62 cools and crystallizes, forming a growing sapphire boule such as boule 65. Boule 65 may form display cover structures for display 12.

The shape of the seed crystal that is used in growing sapphire structure 66 may influence the shape of sapphire structure 66. For example, if the seed crystal has an opening, the resulting sapphire structure that is grown may be hollow. In the illustrative configuration of FIG. 4, seed 64 has the shape of a hollow circular ring having an opening such as opening 70. In general, seed crystals such as seed crystal 64 may have any suitable shape (e.g., rings with one opening, rings with more than one opening, solid shapes with no openings, etc.). Moreover, other types of crystal growth techniques may be used for growing sapphire structures if desired. The illustrative seed crystal arrangement of FIG. 4 is merely illustrative.

Figure 5:
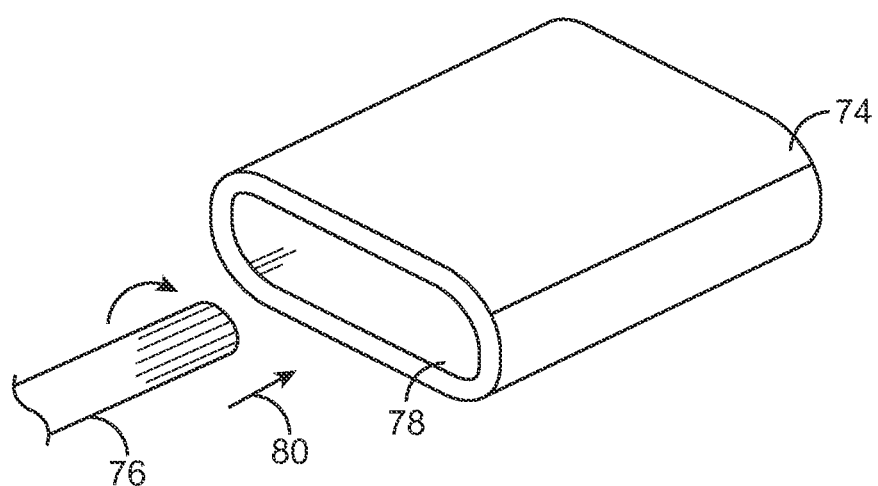
FIG. 5 is a perspective view of an illustrative hollow transparent housing structure and a polishing tool of the type that may be used to polish an interior surface of the housing structure in accordance with an embodiment of the present invention.
Figure 6:
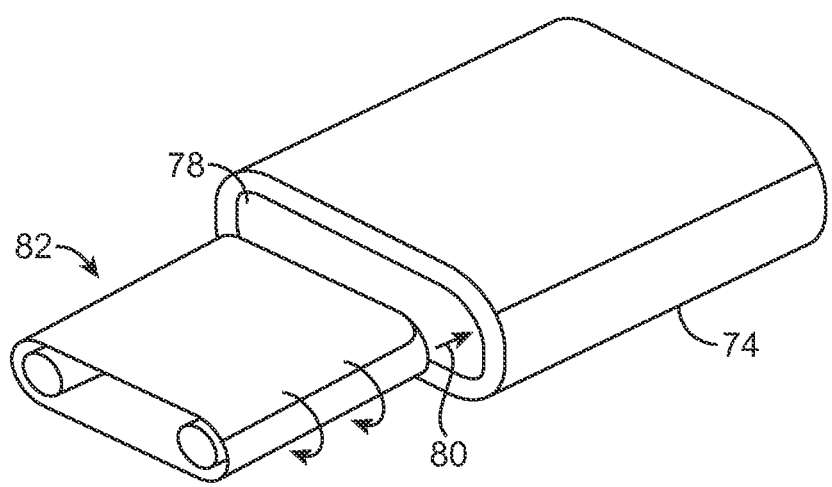
FIG. 6 is a perspective view of an illustrative hollow transparent housing structure and a belt-based polishing tool of the type that may be used to polish an interior surface of the housing structure in accordance with an embodiment of the present invention.

Following formation of a hollow sapphire structure such as structure 66 of FIG. 4, structures 66 may be divided into individual device-sized pieces. The interior surfaces of structures 66 may be sufficiently smooth for use without additional machining. If desired, additional machining operations may be used to smooth interior surfaces. As shown in FIG. 5, for example, interior surface 78 of display cover structure 74 may be machined using rotating tool 76 (e.g., by inserting tool 76 within the hollow interior of structure 74 in direction 80 and moving tool 76 around the entire interior surface of structure 74). As shown in FIG. 6, a belt-based machining (grinding) tool such as tool 82 may be used to machine interior surface 78 of display cover structure 74 after being inserted into the hollow interior of structure 74 in direction 80.

Figure 7:
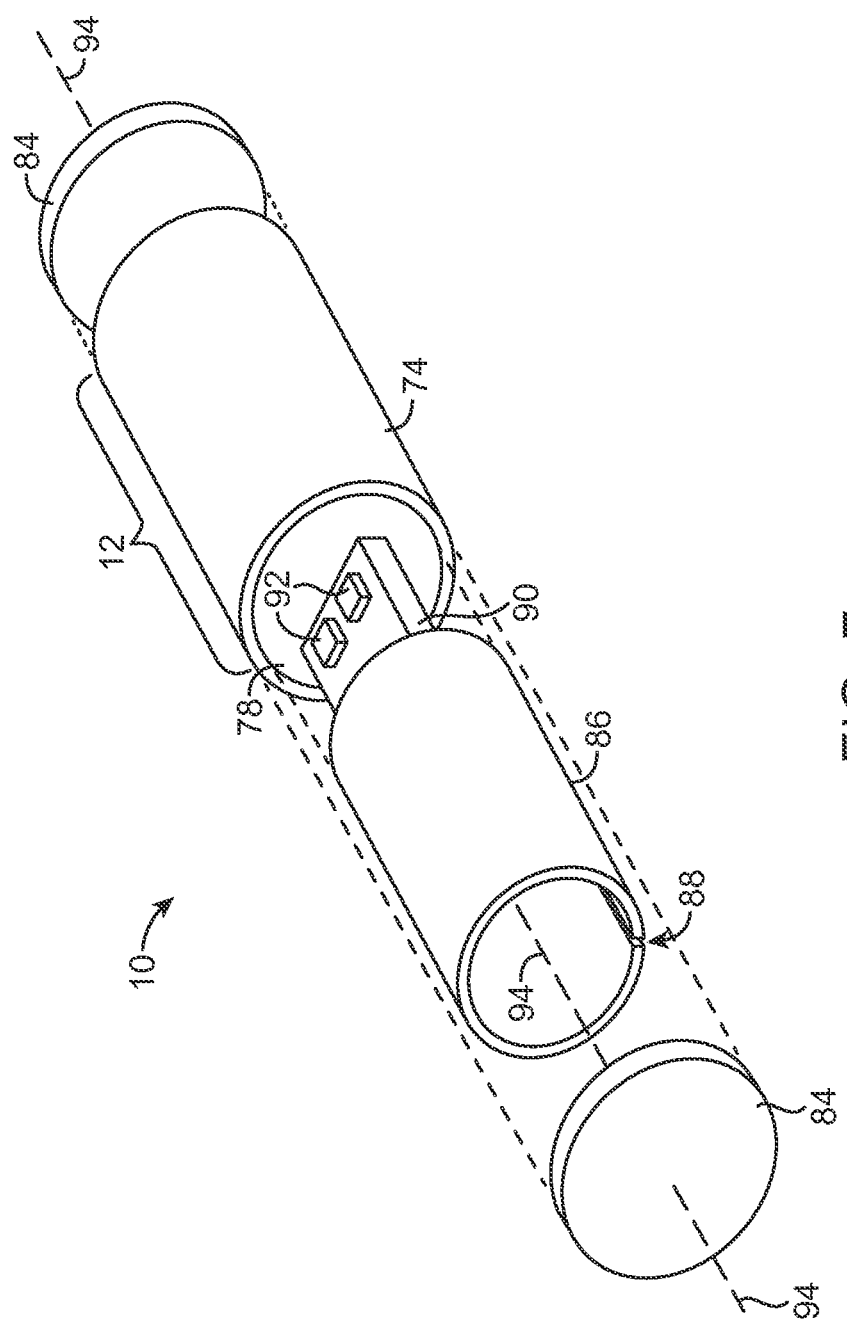
FIG. 7 is an exploded perspective view of a device with a continuous display in accordance with an embodiment of the present invention.

An exploded perspective view of an illustrative device with a wrapped display is shown in FIG. 7. As shown in FIG. 7, device 10 may include hollow display cover structure 74. Device 10 may also include a flexible display layer such as flexible display layer (flexible display) 86. Flexible display layer 86 may be wrapped 360° around longitudinal axis 94 (i.e., display layer 86 may be wrapped around axis 94 sufficiently to surround axis 94). During assembly of layer 86 and display cover structure 74 to form display 12, layer 86 may be attached to inner surface 78 of display cover structure 74 using optically clear adhesive or other fastening mechanisms. Opposing edges of flexible display layer 86 may be joined along seam 88.

Circuitry for device 10 such as storage and processing circuitry 29 and circuitry associated with input-output devices 32 of FIG. 2 may be implemented using components that are mounted within the interior of flexible display layer 86. For example, circuitry for device 10 may be implemented using electrical components 92. Electrical components 92 may include one or more integrated circuits, discrete components such as inductors, resistors, and capacitors, components such as switches, filters, power supply components, connectors, sensors, input-output devices, and other electronic devices.

Electrical components 92 may be mounted on a substrate such as substrate 90. Substrate 90 may be a printed circuit or other dielectric support structure. For example, substrate 90 may be a flexible printed circuit ("flex circuit") formed from a flexible sheet of polyimide or other flexible polymer layer or may be formed from fiberglass-filled epoxy (e.g., FR4) or other rigid printed circuit material. If desired, substrate 90 may be formed from injection molded plastic, ceramic, or other dielectric structures.

Following assembly of display 12 by inserting flexible display layer 86 in display cover structures 74, structures such as end cap structures 84 may be attached to display 12 to form a completed housing for device 10. End cap structures 84 may be formed from plastic, glass, ceramic, crystalline materials such as sapphire, or other suitable materials. End caps 84 may be used in forming structures such as end faces 28 of FIG. 1. Structures such as audio jack port 18 and components 26 may be formed on end caps 84.

Figure 8:
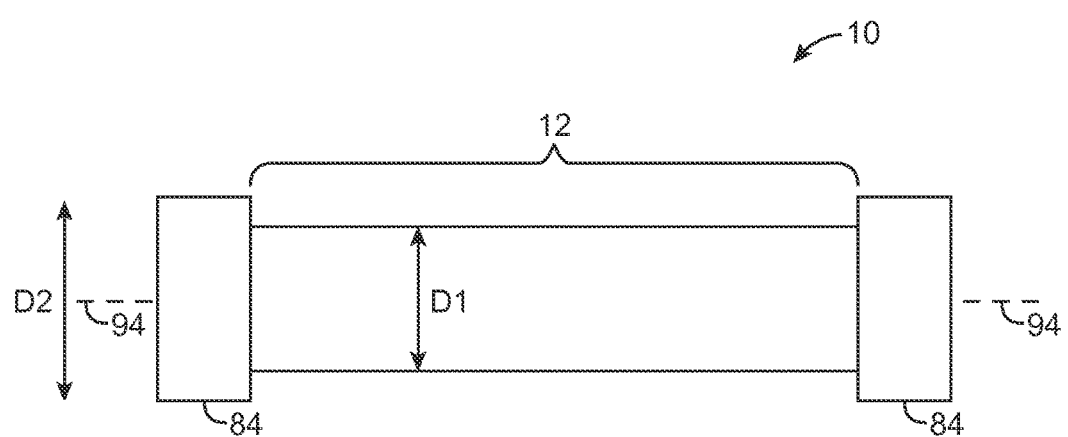
FIG. 8 is a cross-sectional side view of an illustrative device with a continuous display and two end cap structures in accordance with an embodiment of the present invention.

As shown in FIG. 8, end caps 84 may be configured to have a dimension D2 (e.g., a diameter or other lateral dimension perpendicular to longitudinal axis 94) that is slightly larger than dimension D1 (e.g., a diameter or other lateral dimension perpendicular to longitudinal axis 94). This type of arrangement may help protect the exterior surface of display 12 (i.e., the display cover structure from which display 12 is formed) from scratches. If desired, dimensions D1 and D2 may be equal or dimension D2 may be less than dimension D1. The configuration of FIG. 8 in which dimension D2 is larger than dimension D1 to create a gap between display 12 and a surface on which device 10 is resting (e.g., a gap of 0.05 to 2 mm or more than 0.2 mm) is merely illustrative.

Figure 9:
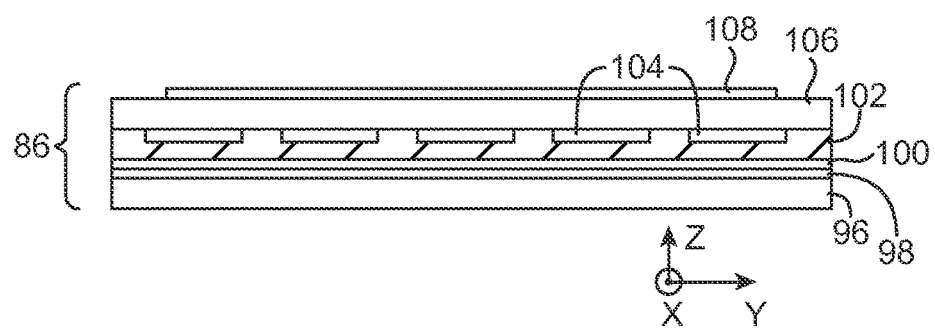
FIG. 9 is a cross-sectional side view of an illustrative flexible display that includes an associated touch sensor array in accordance with an embodiment of the present invention.

Flexible display layer 86 may include multiple layers of material for forming structures such as a flexible display having an array of display pixels and optional touch sensor structures for forming a touch sensor array. An illustrative configuration for flexible display layer 86 is shown in FIG. 9. As shown in FIG. 9, flexible display layer 86 may have a substrate such as substrate 96. Substrate 96 may be formed from a flexible polymer (e.g., polyimide or other suitable material). Structures for emitting light such as display pixel structures 98 may be formed on substrate 96. Display pixel structures 98 may include organic light-emitting diode pixels, pixels based on liquid crystal display structures, electrowetting display pixels, electrophoretic display pixels, or pixels formed using other suitable display technologies. A cover layer such as layer 100 may, if desired, be formed over display pixel layer 98. For example, a clear protected polymer film may be formed over the upper surface of display pixel layer 98 (e.g., a layer of sealant, etc.).

If desired, touch sensor structures may be incorporated into flexible display layer 86. A capacitive touch sensor may, as an example, be formed from an array of capacitive touch sensor electrodes such as electrodes 104 and 108. Electrodes 104 may include row-shaped strips of a transparent conductive material such as indium tin oxide that run parallel to the X axis in FIG. 9. Electrodes 108 may run perpendicular to electrodes 104. For example, electrodes 108 may include column-shaped strips of transparent conductive material such as indium tin oxide that run parallel to the Y axis in FIG. 9. Electrodes such as electrodes 104 and 108 may be formed using other electrode shapes, if desired. The use of strip-shaped electrodes in the example of FIG. 9 is merely illustrative.

Electrodes 104 and 108 may be formed on the opposing lower and upper surfaces of substrate 106 or, if desired, may be formed on the same surface of substrate 106 or other substrates (e.g., a cover layer, other display layers, etc.). Substrate 106 may be formed from a material such as polyimide or other transparent flexible polymer. If desired, touch sensor arrays may be formed using other types of touch sensors. For example, touch sensor arrays for flexible display 86 may be formed from resistive touch sensor structures, force-based touch sensor structures, light-based touch sensor structures, or other touch technologies. The use of capacitive touch sensor structures to form a touch sensor array for flexible display layer 86 is merely illustrative. Touch sensor structures may be attached to display layers such as layers 96, 98, and 100 using adhesive such as optically clear adhesive 102 or other suitable attachment mechanisms.

Figure 10:
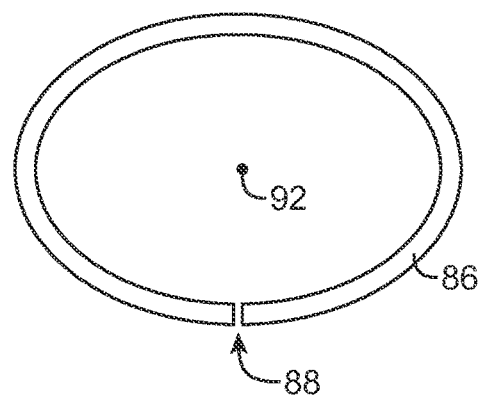
FIG. 10 is a cross-sectional end view of a flexible display of the type shown in FIG. 9 showing how ends of the display may be oriented to abut one another in accordance with an embodiment of the present invention.

As shown in the end view of FIG. 10, flexible display layer 86 may be wrapped around longitudinal axis 94 to form a cylindrical shape suitable for covering a cylindrical inner surface of a hollow display cover structure. Flexible display layer 86 may, in general, be wrapped around axis 94 to form a shape with a circular cross section, an oval cross section, a triangular cross section, a rectangular cross section, a rectangular cross section or other cross section with one, two, three, four, or more than four rounded edges, other polygonal cross sections, or other suitable shapes. As shown in FIG. 10, opposing edges 86A and 86B of flexible display layer 86 may be configured to abut one another without overlapping along seam 88. As shown in the illustrative configuration of FIG. 11, edges 86A and 86B may overlap along seam 88, if desired.

Figure 12:
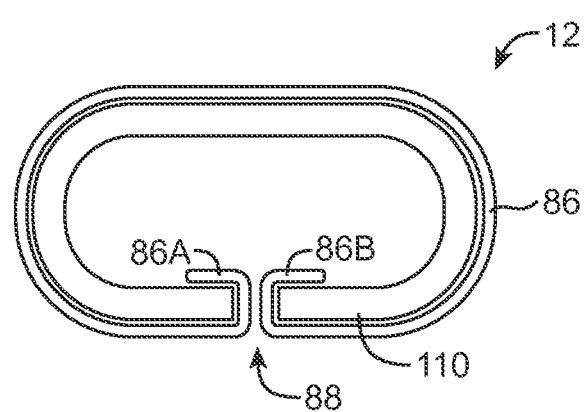
FIG. 12 is a cross-sectional end view of a flexible display that has been wrapped around and into a support structure along a seam in accordance with an embodiment of the present invention.

As shown in the cross-sectional end view of flexible display layer 86 of FIG. 12, edges 86A and 86B of flexible display layer 86 may be flared outwardly so as not to overlap each other along seam 88. This allows small inactive edge portions of display layer 86 to be hidden from view in the interior of device 10, thereby minimizing or eliminating exposed inactive display areas on the exterior of display 12.

Figure 11:
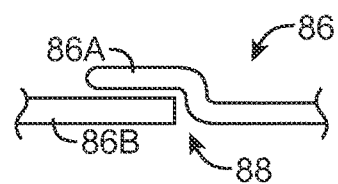
FIG. 11 is a cross-sectional view of two opposing ends of a flexible display in a device with a continuously wrapped display showing how portions of the flexible display ends may overlap each other in accordance with an embodiment of the present invention.

Flexible display layer 86 may, if desired, be mounted on an internal support structure such as support structure 110 of FIG. 12 (using a seam configuration of the type shown in FIG. 10, 11, or 12 or other suitable seam configuration).

Support structure 110 may be formed from plastic or other suitable materials. Flexible display layer 86 may be attached to support structure 110 using adhesive or the interface between layer 86 and support structure 110 may be free of adhesive. A layer of foam or other biasing structure may be used to help push flexible display layer 86 outwards against inner surface 78 of display cover structure (FIG. 7) and/or a layer of adhesive may be interposed between flexible display layer 86 and inner surface 78 to help attach flexible display layer 86 to display cover structure 74.

Figure 13:
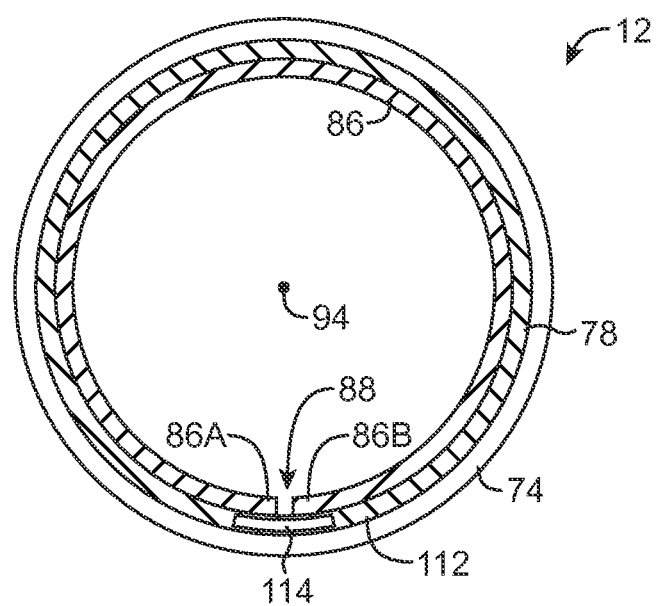
FIG. 13 is a cross-sectional end view of a device with a continuously wrapped display showing how a seam region between opposing ends of the wrapped display may be covered using a strip of opaque masking material on an interior surface of an elongated hollow transparent housing member in accordance with an embodiment of the present invention.

FIG. 13 is a cross-sectional end view of display 12 in an illustrative configuration in which flexible display layer 86 has been attached to inner surface 78 of display cover structure 74 using a layer of adhesive such as optically clear adhesive 112. As shown in FIG. 13, flexible display layer 86 may have a seam such as seam 88 that is formed along the line where edges 86A and 86B of flexible display layer meet (in an overlapping or non-overlapping configuration). If desired, seam 88 may be hidden from view using an opaque structure such as opaque structure 114. Opaque structure 114 may be formed from a strip of material such as metal, plastic, ceramic, ink, paint, or other opaque materials. As an example, structure 114 may be an opaque masking layer formed from a layer of black ink having a rectangular strip shape that extends along the length of seam 88.

Figure 14:
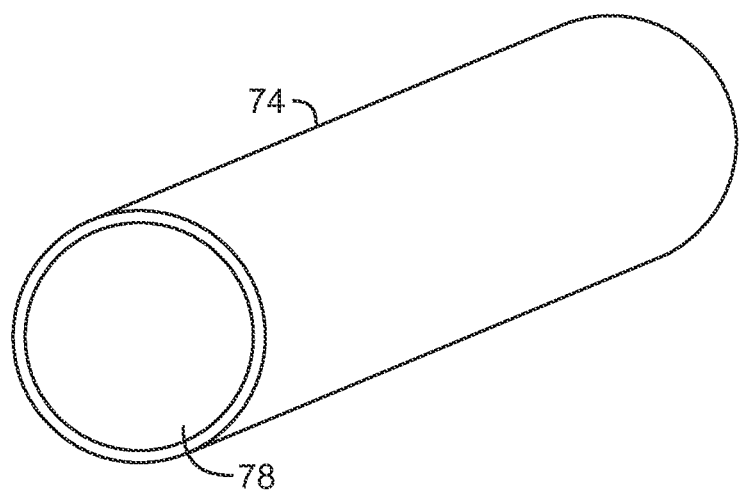
FIG. 14 is a perspective view of an illustrative cylindrical transparent housing structure in accordance with an embodiment of the present invention.
Figure 15:
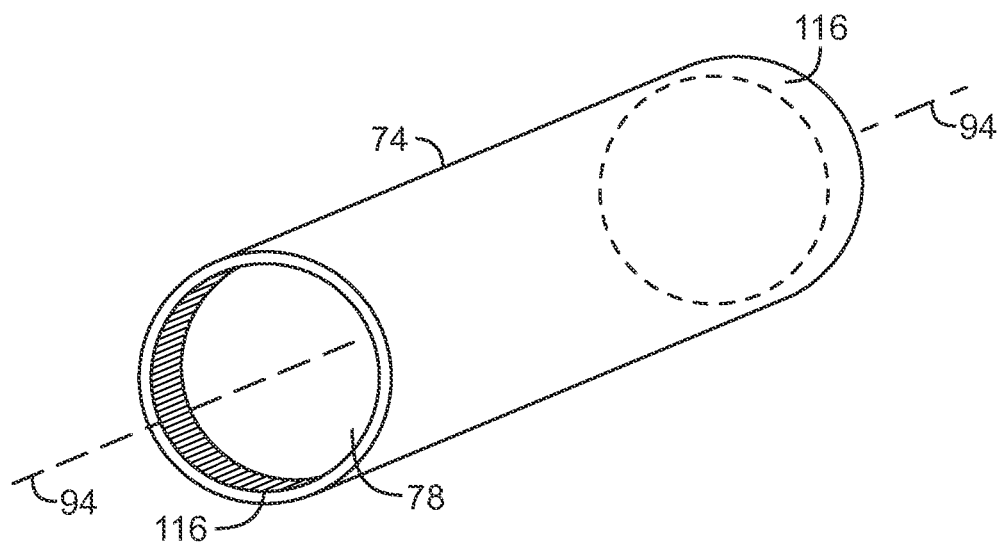
FIG. 15 is a perspective view of the cylindrical transparent housing structure of FIG. 14 that has been provided with a ring of opaque masking material around each end in accordance with an embodiment of the present invention.

FIG. 14 is a perspective view of display cover structure 74 in a configuration in which inner surface 78 is devoid of opaque masking material 114. As shown in the example of FIG. 15, circumferential end bands or other portions of inner surface 78 of display cover structure 74 may be covered with opaque masking material in the shape of opaque rings 116 at longitudinally opposing ends of display cover structure 74.

Figure 16:
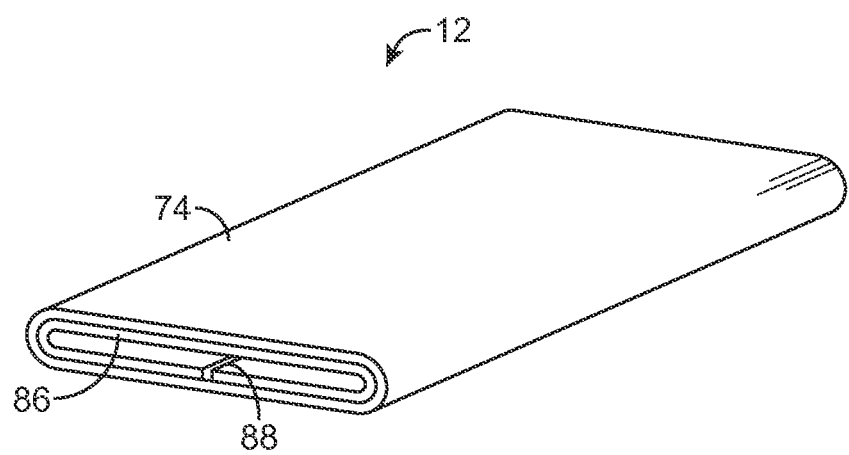
FIG. 16 is a perspective view of an illustrative electronic device with a rounded rectangular cross-section in accordance with an embodiment of the present invention.

FIG. 16 is a perspective view of illustrative structures for display 12 in which elongated transparent display cover structure 74 and flexible display layer 86 have been configured to form a display having an elongated shape with a rectangular cross section with rounded edges.

Figure 17:
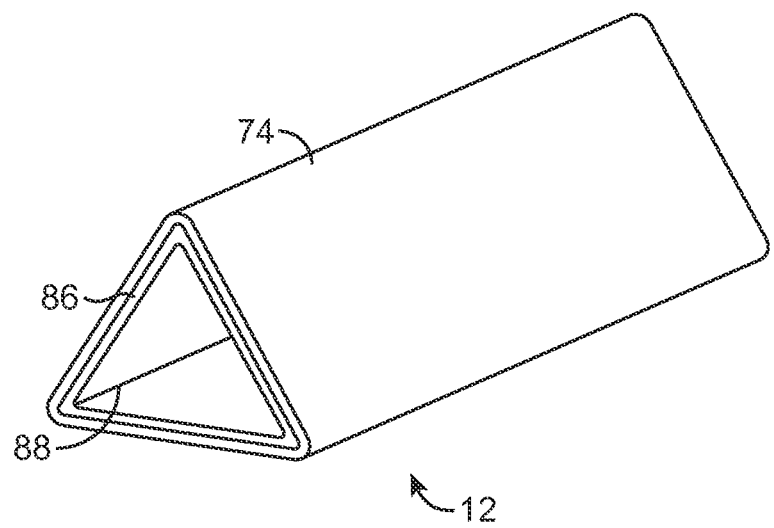
FIG. 17 is a perspective view of an illustrative electronic device with a triangular cross-section in accordance with an embodiment of the present invention.

FIG. 17 is a perspective view of illustrative structures for display 12 in which display cover structure 74 and flexible display layer 86 have been configured to form a display having an elongated shape with a triangular cross section.

Figure 18:
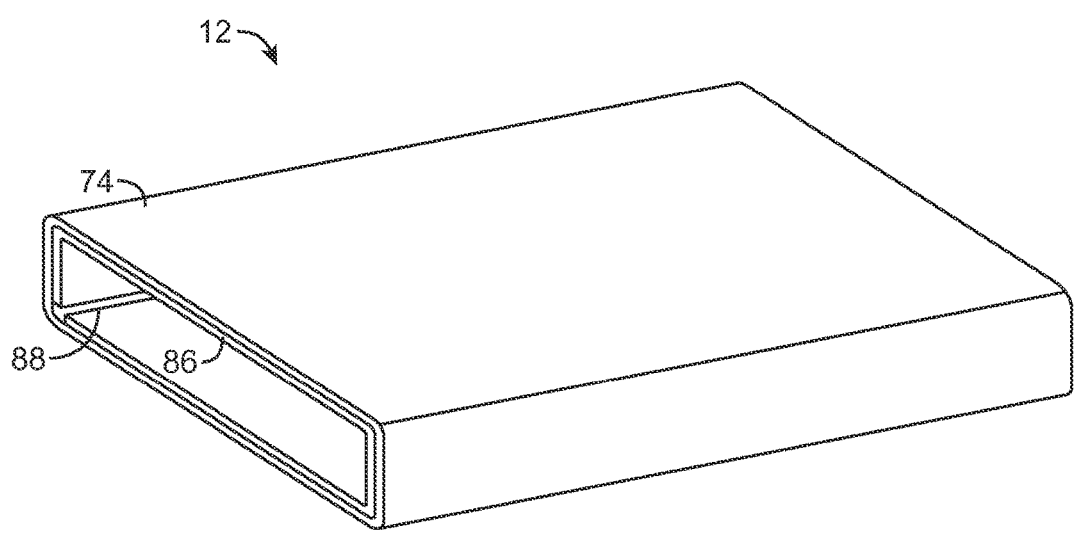
FIG. 18 is a perspective view of an illustrative electronic device with a rectangular cross-section in accordance with an embodiment of the present invention.

In the illustrative configuration of FIG. 18, display cover structure 74 and flexible display layer 86 have been configured to form a display having an elongated shape with a rectangular cross section with perpendicular side walls.

Figure 19:
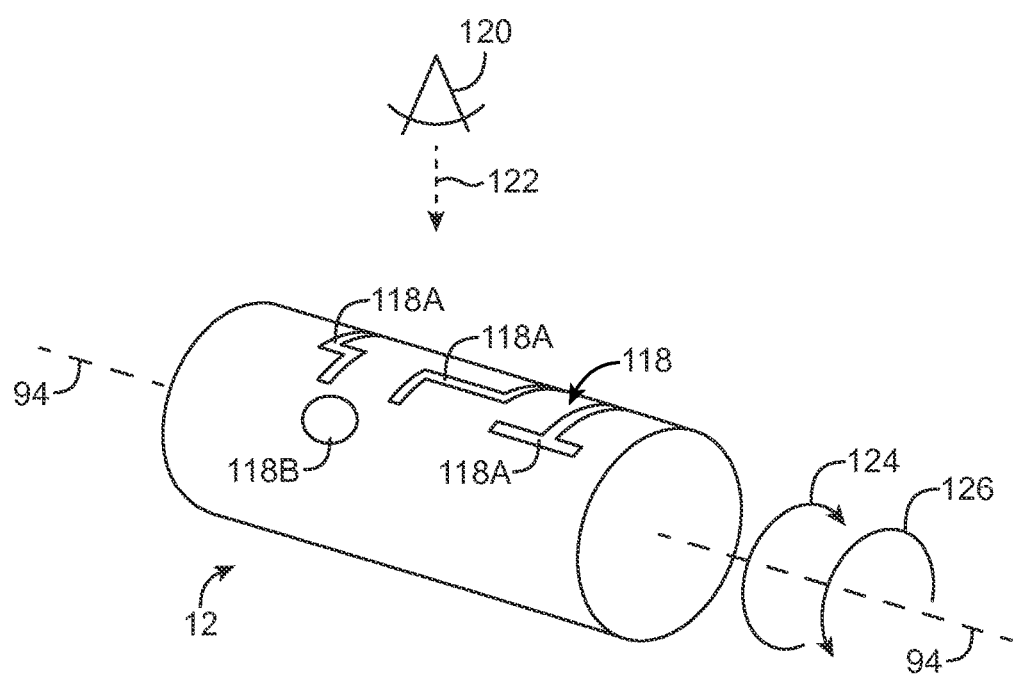
FIG. 19 is a perspective view of an illustrative electronic device with a continuously wrapped display that is being rotated during use while measurements of device orientation and motion are being made in accordance with an embodiment of the present invention.

FIG. 19 is a perspective view of display 12 in the process of displaying content 118 for a user of device 10. The user may be positioned, for example, at viewer location 120 and may view display 12 in direction 122. As the user is using device 10, the user may rotate device 10 about axis 94. For example, while staying in a fixed viewing location such as position 120, the user may rotate display 12 in counterclockwise direction 126 about axis 94. At the same time as the user is rotating display 12 (and device 10) in a counterclockwise fashion, device 10 may rotate content 118 (or some of content 118) on the surface of display 12 in the opposite direction (i.e., in clockwise direction 124). An accelerometer, gyroscope, and/or other sensors in device 10 may be used in monitoring the rotation and orientation of device 10 and display 12 in real time. Content can be displayed in synchronization with the rotation of display 12, if desired.

By rotating some of content 118 to counteract the rotation of display 12, device 10 may maintain portions of content 118 stationary with respect to viewer position 120 while other portions of content 118 are allowed to rotate with the display. For example, a game or other software may be implemented on device 10 that contains a ball or other object such as object 118B. Object 118B may be moved relative to the surface of display 12 by tilting and rotating display 12. Content 118A may remain stationary on the surface of display 12 as the user manipulates display 12.

As an example, content 118A may represent the walls of a maze in a game and content 118B may represent a ball that moves relative to the walls of the maze. As the user rotates display 12 in direction 126, walls 118A may rotate in the same direction as display 12, as if walls 118A were affixed to the surface of display 12. While walls 118A are being rotated in this way relative to viewer location 120, ball 118B may be displayed in a fixed location relative to viewer location 120 (i.e., the location of ball 118B may be moved on display 12 in synchronization with the user's rotation of display 12 so that ball 118B is maintained at a fixed location with respect to the user).

Ball 118B may be located on an upper surface of display 12 in the orientation of FIG. 19. Movement of ball 118B relative to maze walls 118A (i.e., movement back and forth parallel to longitudinal axis 94 to traverse maze 118A) may be made using an accelerometer or other sensor in device 10 to monitor tilting of device 10 relative to the surface of the Earth. Because display 12 is wrapped around device 10, a user can rotate display 12 and device 10 indefinitely and device 10 can continually update the displayed content on display 12. This allows the user to continue playing the game indefinitely without running out of display surface real estate. Any of applications 48 or operating system 46 of FIG. 3 may display content 118 on display 12 in this way, if desired (e.g., map applications, navigation applications, music applications that display music scores and other information, video editing applications that display videos on a timeline, etc.). The use of a game application to illustrate the use of a wrapped display on device 10 is merely illustrative.

Figure 20:
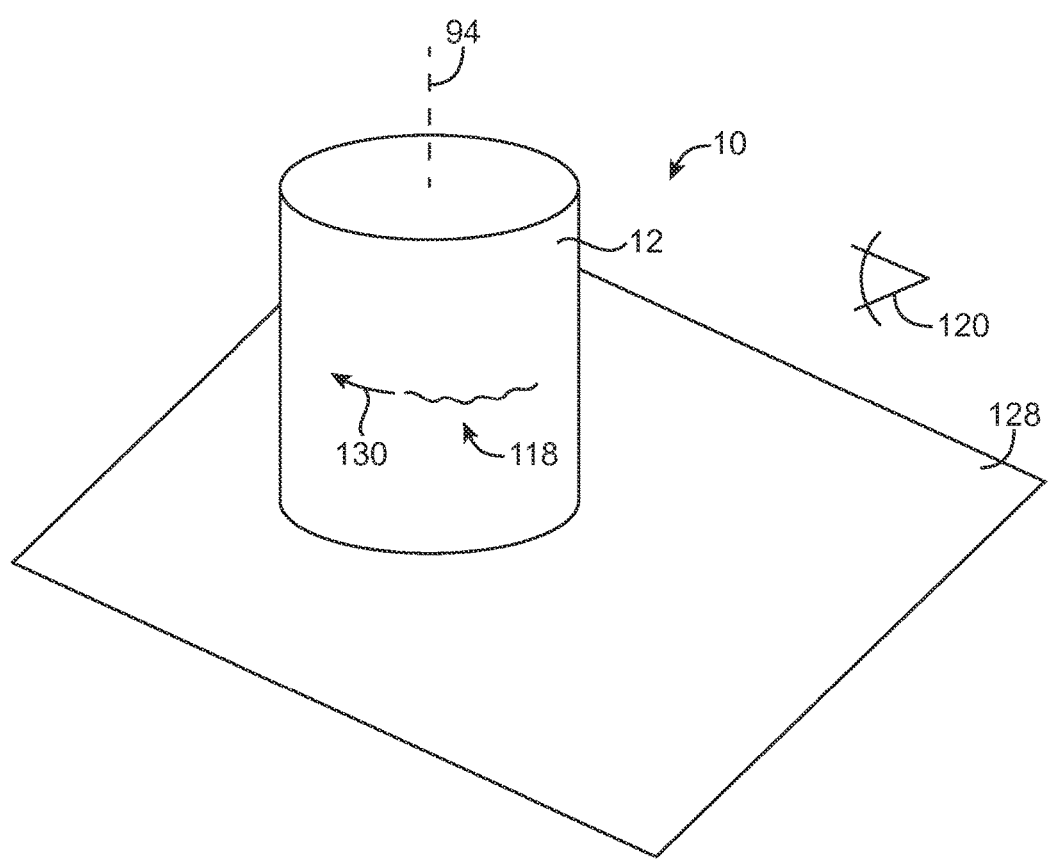
FIG. 20 is a perspective view of an illustrative electronic device with a continuously wrapped display that has been placed on one of its ends and that is displaying horizontally scrolled content automatically in response to detection of a vertical device orientation in accordance with an embodiment of the present invention.

As shown in FIG. 20, device 10 may, if desired be placed in an end-down position on a surface such as surface 128. In this type of arrangement, the entire surface of display 12 may be exposed. Device 10 may display content such as content 118 in a static fashion (i.e., in a stationary position relative to the stationary surface of display 12) or may move content 118 on the surface of display 12. For example, device 10 may automatically scroll content 118 around the surface of display 12 in direction 130 (e.g., in a "stock ticker" mode) in response to data from an accelerometer or other sensor that indicates that device 10 has been placed in an orientation in which longitudinal axis 94 is oriented vertically. Information that may be displayed in this way includes content associated with games, video, text (e.g., stock quotes, sports scores, news headlines, etc.).

Figure 21:
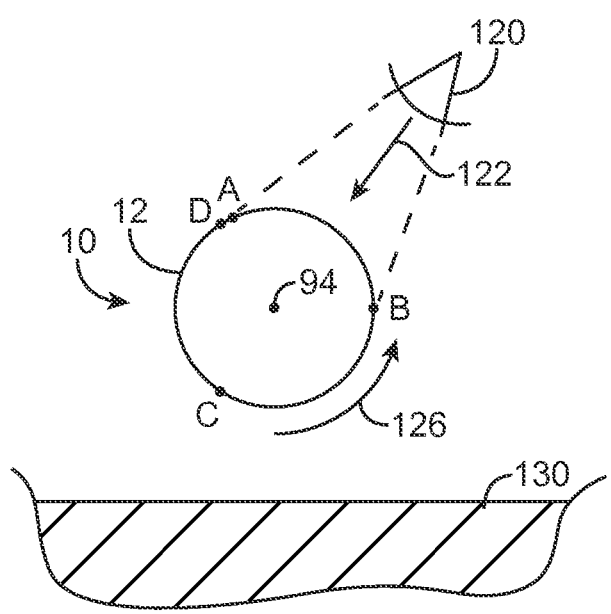
FIG. 21 is a cross-sectional side view of an illustrative electronic device with a continuously wrapped display that is being rotated by a user while content such as static and moving content is displayed on the display in accordance with an embodiment of the present invention.

FIG. 21 is a side view of device 10 showing how wrapped display 12 may be viewed in direction 122 by a user at viewer position 120 while rotating device 10 and display 12 in direction 126. The surface of display 12 may be considered to be made up of four contiguous areas—a first area extending from A to B, a second area extending from B to C, a third area extending from C to D, and a forth area extending from D to A. Device 10 may use an accelerometer, gyroscope, or other sensors in determining the orientation of device 10 and display 12 relative to the Earth (surface 130). Using this information, device 10 can display information on display 12 in real time that is based on the user's positioning of device 10 relative to the Earth and/or other appropriate inputs (e.g., time, date, content, etc.).

Figure 22:
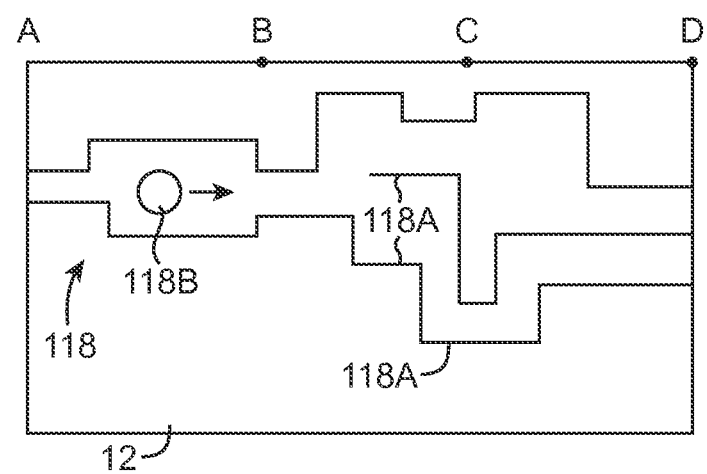
FIG. 22 is a diagram showing content of the type that may be displayed on a continuously wrapped display such as scrolling game content in accordance with an embodiment of the present invention.

FIG. 22 shows how a display such as display 12 of FIG. 21 may display content 118 that includes static content 118A (e.g., lines in a maze that are in a fixed position relative to the surface of display 12) and moving content 118B (e.g., a moving ball or other moving content that may or may not be positioned so as to remain at a fixed location relative to a user).

Figure 23:
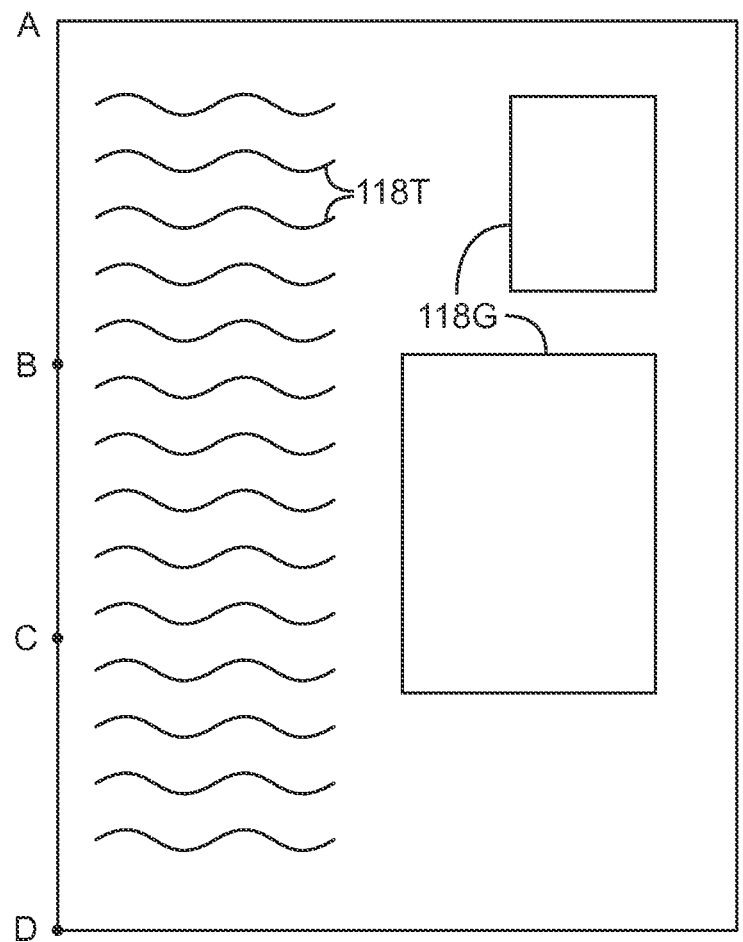
FIG. 23 is a diagram showing content of the type that may be displayed on a continuously wrapped display such as scrolling text in accordance with an embodiment of the present invention.

As shown in FIG. 23, content 118 may include text 118T and graphics 118G. As a user rotates display 12, content 118 may be updated. For example, device 10 may update the portion of display 12 that is not currently visible to the user with fresh content, so that the content on display 12 appears to be continuous (unending) and so that there are no visible artifacts associated with the updating process. This type of arrangement may be used to allow a user to read a book or other long document without turning pages. Media files and other information may also be displayed in this way.

As the user continuously rotates device 10 about axis 94 (FIG. 21), content 118 can be updated in real time. Content 118 may be displayed at a fixed location on display 12, so that content 118 moves as display 12 is rotated. If desired, content 118 may rotated about axis 94 in synchronization with the rotation of display 12. For example, an object may be displayed at a position that moves along the surface of display 14 in synchronization with the rotation of display 12 about axis 94. Content can be rotated about axis 94 at a speed that maintains the object at a fixed position relative to a user.

Figure 24:
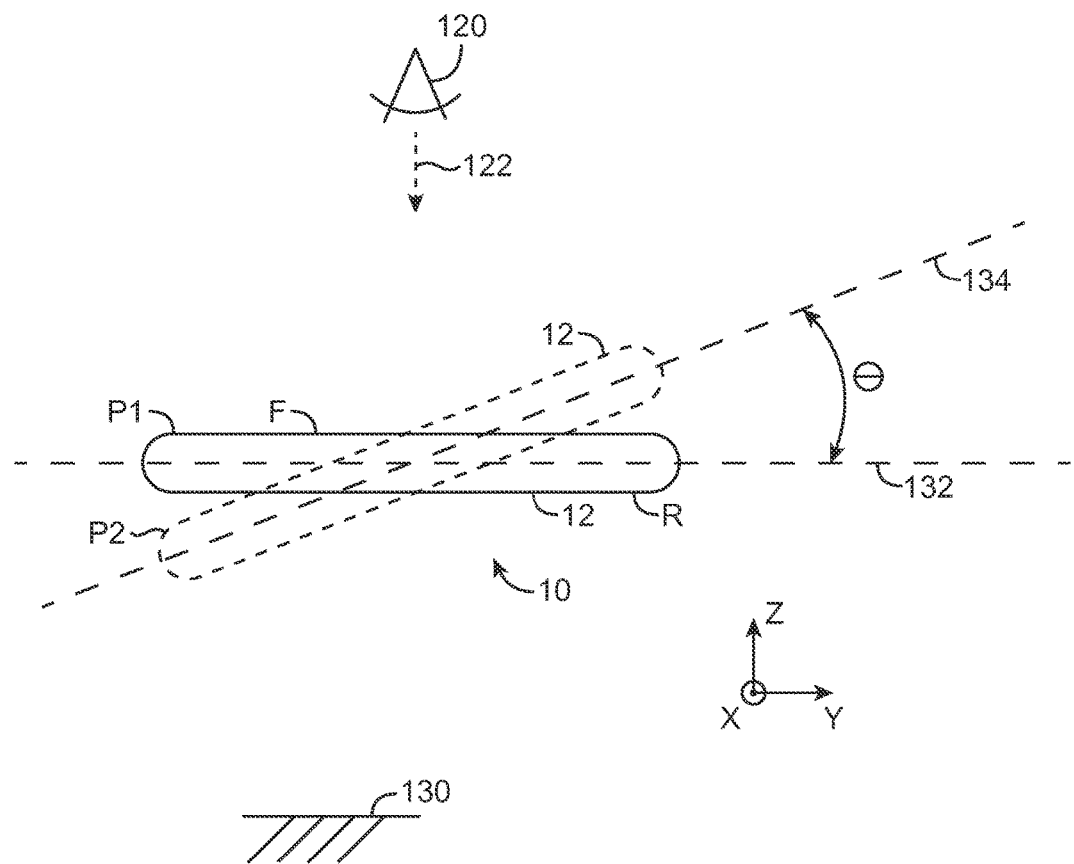
FIG. 24 is a side view of an illustrative electronic device with a continuously wrapped display that is being tilted forwards and back by a user to control display of content on the display in accordance with an embodiment of the present invention.

FIG. 24 is a side view of an illustrative configuration that may be used for device 10 in which display 12 has a rectangular cross-sectional shape with rounded edges. This type of configuration may be used, for example, to provide display 12 with front and rear surfaces (F and R in FIG. 24) that are substantially planar. Surfaces F and R may be used, for example, to read text and view other content. An accelerometer or other sensor may be used by device 10 to monitor the orientation of device 10 relative to the Earth (surface 130). Initially, a user may be holding device 10 so that front surface F and rear surface R are horizontal and lie along axis 132 in the X-Y plane. The user may control the display of information on display 12 by tilting device 10 (e.g., by rotation from a nominal horizontal position), by using touch gestures, using buttons, using voice commands, or using other user input.

As an example, the user may tilt device 10 so that device 10 is aligned along axis 134 at an angle θ with respect to axis 132 and the X-Y plane. The tilt magnitude (i.e., the magnitude of angle θ) or other tilt (rotation) data such as angular motion data associated with placing device 10 at angle θ may be used in flipping pages of text on front face F, may be used in determining whether to display information on front F or rear R of display 12, may be used in providing motion to content 118 on display 12 (see, e.g., ball 118B of FIG. 19), or may otherwise be used in controlling the display of information on display 12. For example, a user may be reading a document with pages of content 118. To move forward or backwards through content 118 (i.e., to turn pages), the user may flip (invert) device 10 so that front face F is oriented downwards and rear face R is faced upwards (i.e., to move device into a configuration in which the magnitude of angle θ is 180°).

Figure 25:
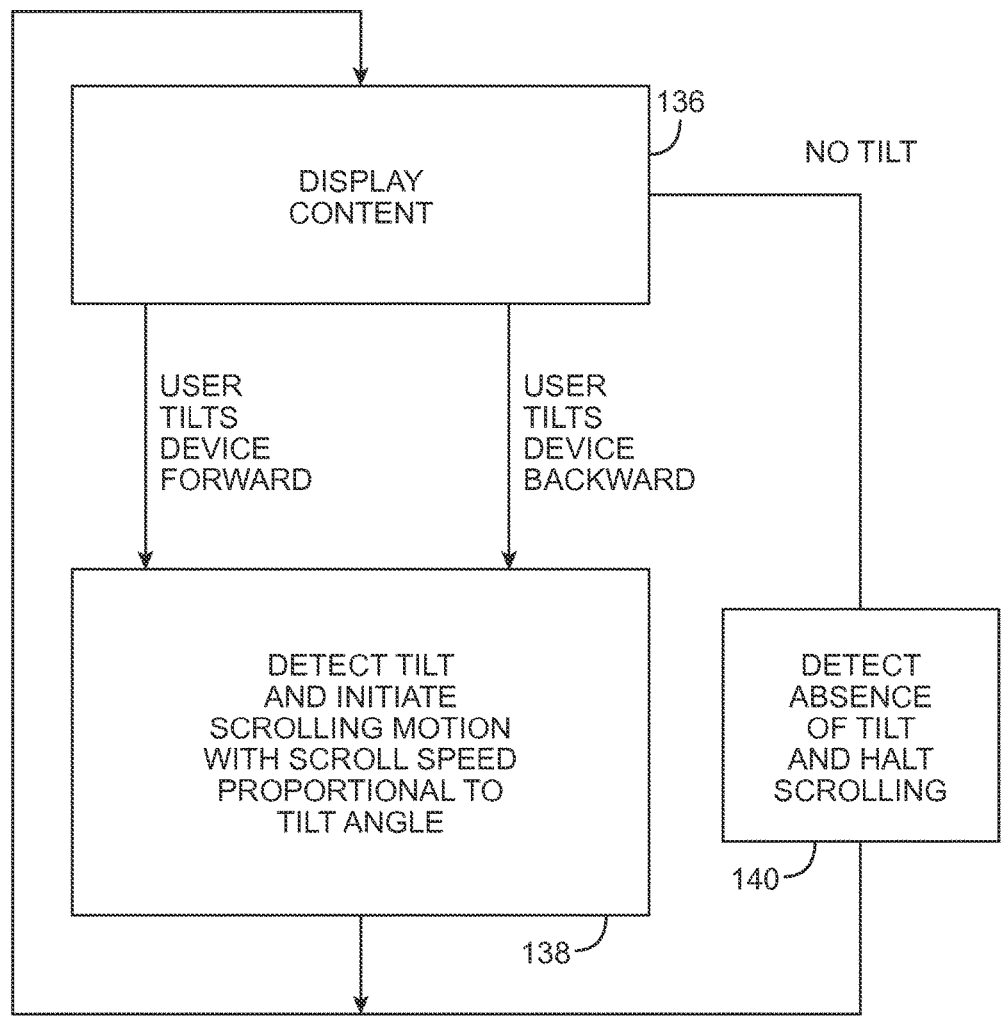
FIG. 25 is a flow chart of illustrative steps involved in displaying content on an electronic device with a continuously wrapped display and controlling the display of the content using tilting operations or other user input in accordance with an embodiment of the present invention.

FIG. 25 is a flow chart of illustrative steps involved in displaying content 118 on display 12 based on information such as orientation (faced up or down) or other tilt angle input. At step 136, device 10 may display content 118 on display 12. Device 10 may, for example, display content 118 on front face F and optionally on rear face R and the sidewall surfaces of wrapped display 12 of FIG. 24 (or other suitable display with front and rear surfaces)

During the operations of step 136, device 10 may use an accelerometer or other sensor to determine the orientation of device 10 relative to Earth 130 (e.g., to measure angle θ or to gather other tilt data). When the user makes a forward tilt motion (e.g., by exceeding a predetermined tilt angle or forward-tilting angular velocity), device 10 may detect a forward tilt event. When the user makes a backwards tilt motion (e.g., by exceeding a predetermined negative tilt angle or backwards-tilting angular velocity), device 10 may detect a backward tilt event. Device 10 may then display content 118 on display 12 based on the type of tilt event that is detected (step 138). For example, device 10 may scroll content 118 up or down depending on tilt direction, may flip through pages of content based on tilt direction, may control the movement of objects on display 12 based on tilt (rotational) data, or may make other suitable adjustments to content 118 on display 12 in real time. In response to detection of the cessation of tilting (i.e., in response to the return of device 10 to a tilt angle less than a predetermined tilt angle or the restoration of device 10 to a suitable angular velocity change), device 10 can halt the scrolling of content 118 on display 12, may change the speed at which content 118 is scrolled on display 12, or may otherwise adjust the way in which scrolled content 118 is displayed on display 12 (step 140).

Figure 26:
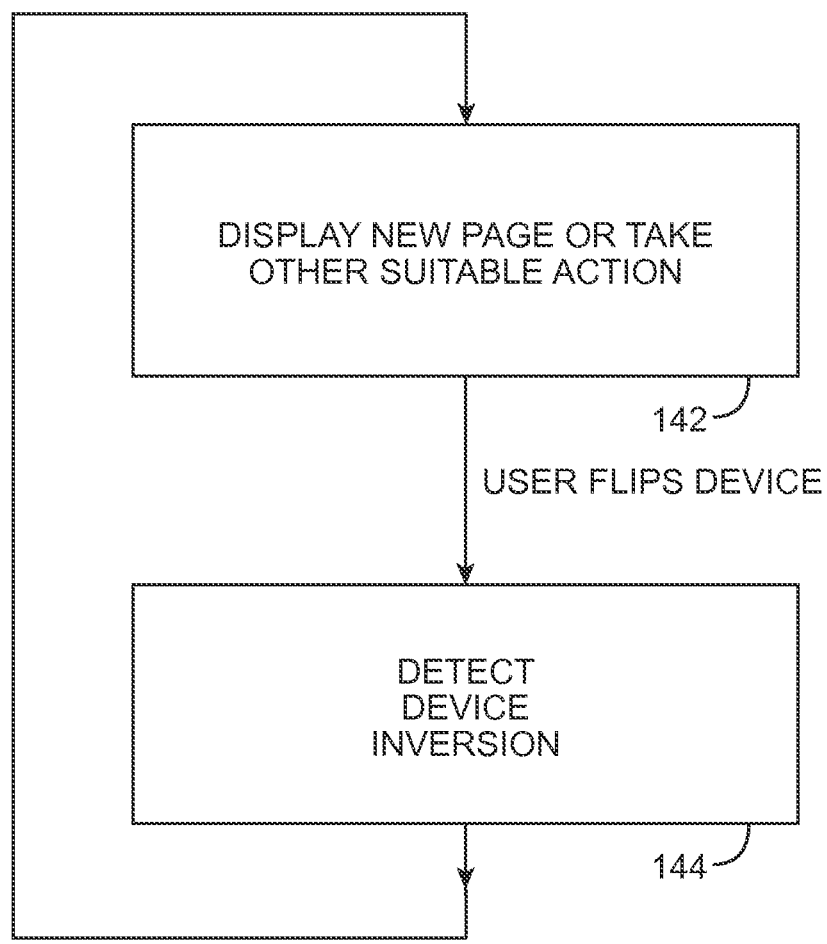
FIG. 26 is a flow chart of illustrative steps involved in displaying content on an electronic device with a wrapped display based on device orientation or other input in accordance with an embodiment of the present invention.

FIG. 26 is a flow chart of illustrative steps involved in updating the display of pages (screens) of content on display 12 in response to tilt events (e.g., full device inversions or other tilting data). At step 142, device 10 may display a new page of content on display 12. For example, device 10 may display a page of text from a book, a screen filled with graphics or video, or other screen of content. During the operations of step 142, device 10 may use an accelerometer, gyroscope, or other sensor to gather tilt data (angle, angular motion, etc.). As the user tilts device 10 by 180° (e.g., to invert device 10 so that front face F of display 12 faces downwards), device 10 can detect this event using the accelerometer, gyroscope, or other sensor (step 144) and can take suitable actions in response (e.g., by flipping to a new page, screen of graphics, or other content at step 142). The user may tilt device 10 so that device 10 rotates around axis 94 or may tile device 10 perpendicular to axis 94 or in other directions.

Figure 27:
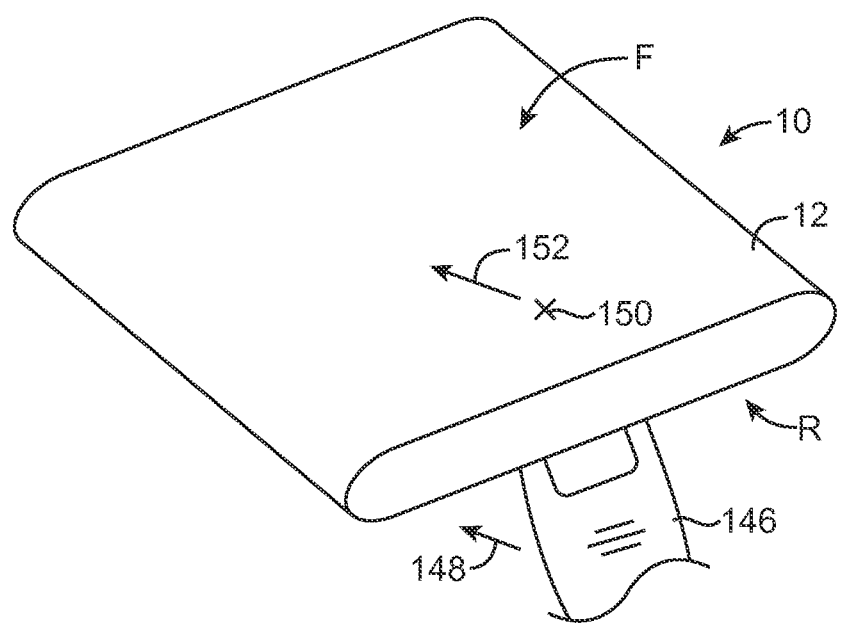
FIG. 27 is a perspective view of an illustrative electronic device with display such as a wrapped display in which a user is supplying a touch command to a hidden portion of the display while the device is displaying corresponding content on a visible portion of the display in accordance with an embodiment of the present invention.

FIG. 27 is a perspective view of device 10 (e.g., a device such as device 10 of FIG. 1 having features such as those of device 10 of FIG. 21 and/or FIG. 24 and the other FIGS.) in a configuration in which a user's finger 146 or other external object is being moved along rear surface R of display 12 while suitable actions are being taken in response by device 10. A user may, for example, move finger 146 in direction 148 across lower surface R. Display 12 may include a touch sensor array that detects the movement of finger 146 (e.g., a single-finger or, if desired, multi-finger touch gesture). In response, device 10 may move content 118 on front surface F of display 12. For example, device 10 may move object 150 in direction 152 (parallel to direction 148). Device 10 may also take other suitable actions such as moving forwards or backwards through content, flipping pages of content, advancing or moving backwards through content screens, scrolling through content, changing a content scrolling direction or speed, etc.

Figure 28:
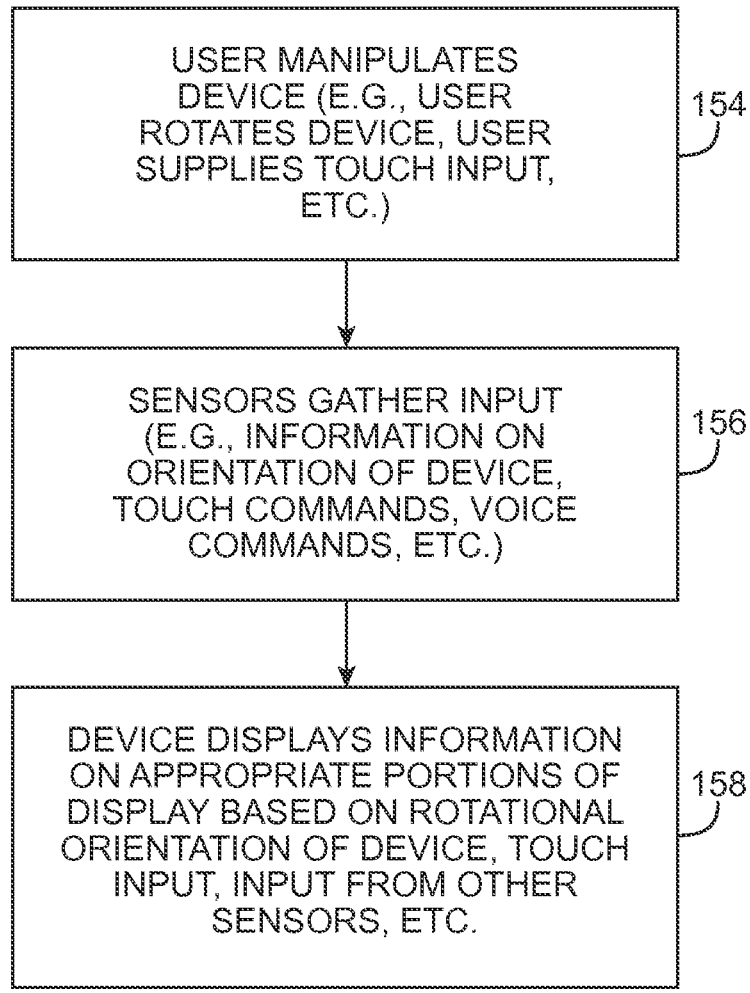
FIG. 28 is a flow chart of illustrative steps involved in gathering sensor input and taking appropriate actions based on the sensor input in an electronic device with a wrapped display in accordance with an embodiment of the present invention.

FIG. 28 is a flow chart of illustrative steps involved in displaying content 118 (moving and/or static) on wrapped display 12 in response to sensor input, time data, date data, other external data, user input, or other input.

At step 154, a user may manipulate device 10. For example, a user may tilt device 10, may rotate device 10 to exceed a predetermined angular velocity or acceleration, may supply touch input (e.g., touch gestures), may press buttons to supply user input, may issue voice commands, or may otherwise take actions to supply input to device 10.

During the operations of step 156, device 10 may gather corresponding input data. Device 10 may, for example, use an accelerometer, gyroscope, ambient light sensor, camera, microphone, touch sensor, clock or other input device to gather input as the user is supplying input by manipulating device 10.

At step 158, device 10 may display content 118 on display 12 based on the gathered input of step 156. For example, device 10 may move an object on display 12, may hold certain objects fixed (e.g., to allow the objects to rotate as display 12 is rotated), may flip pages or other screens of content, may scroll content or adjust scroll speed or page flip speed, may change the volume of media playback, may adjust screen colors, may take actions in a productivity application (e.g., by making an edit or taking other actions in a word processor, document editor, or other content editing program), may take actions in a game (e.g., to move graphic elements), may take actions in connection with operating system functions (e.g., to delete or move a file), or may take other suitable actions.

Device 10 may, if desired, take certain actions automatically. For example, device 10 may automatically scroll content around display 12 as described in connection with FIG. 20 in response to detection of a vertical device orientation of the type shown in FIG. 20 (i.e., an orientation in which rotational axis 94 is vertical with respect to the ground).

The foregoing is merely illustrative of the principles of this invention and various modifications can be made by those skilled in the art without departing from the scope and spirit of the invention.

What is claimed is:

1. An electronic device having opposing first and second ends, the electronic device comprising:
   a transparent cover structure having a planar front portion, a planar rear portion opposite the planar front portion, and a rounded edge portion that curves between the planar front portion and the planar rear portion, wherein the planar front portion and the planar rear portion are separated by gaps at the opposing first and second ends;
   housing structures that cover the gaps at the opposing first and second ends, wherein the housing structures comprise a microphone port;
   a flexible display layer having a planar front portion that overlaps the planar front portion of the transparent cover structure, a planar rear portion that overlaps at least some of the planar rear portion of the transparent cover structure, and a rounded edge portion that extends from the planar front portion of the flexible display layer to the planar rear portion of the flexible display layer; and
   a touch sensor that overlaps the planar front portion of the transparent cover structure.

2. The electronic device defined in claim 1, wherein the rounded edge portion of the transparent cover structure comprises a rounded inner surface, and wherein the rounded edge portion of the flexible display layer conforms to the rounded inner surface.

3. The electronic device defined in claim 1, wherein the planar front and rear portions of the transparent cover structure are parallel.

4. The electronic device defined in claim 1, wherein the planar rear portion of the transparent cover structure comprises a planar inner surface, and wherein the planar rear portion of the flexible display layer conforms to the planar inner surface.

5. The electronic device defined in claim 1, wherein the transparent cover structure comprises an additional rounded edge portion opposite the rounded edge portion of the transparent cover structure.

6. The electronic device defined in claim 5, wherein the additional rounded edge portion of the transparent cover structure comprises an additional rounded inner surface, and wherein the flexible display layer comprises an additional rounded edge portion that conforms to the additional rounded inner surface.

7. The electronic device defined in claim 6, wherein the flexible display layer extends along the planar front portion of the transparent cover structure from the rounded edge portion to the additional rounded edge portion of the transparent cover structure.

8. The electronic device defined in claim 6, wherein the flexible display layer extends along the planar rear portion of the transparent cover structure from the rounded edge portion to the additional rounded edge portion of the transparent cover structure.

9. The electronic device defined in claim 1, wherein rounded edge portion of the flexible display layer extends continuously from the planar front portion of the flexible display layer to the planar rear portion of the flexible display layer.

10. The electronic device defined in claim 1, wherein the rounded edge portion of the transparent cover structure extends continuously from the planar front surface of the transparent cover structure to the planar rear surface of the transparent cover structure.

11. An electronic device having a front surface that defines a first plane, a rear surface that defines a second plane, a side surface that defines a third plane and extends between the front and rear surfaces, and first and second opposing ends, the electronic device comprising:
    a flexible display layer having a first planar portion that covers the front surface, a second planar portion that covers the rear surface, a third planar portion that extends between the first and second planar portions and covers the side surface, and a fourth portion that extends between the first and second planar portions opposite the third portion;
    a flexible touch sensor layer having a first planar portion that covers the front surface, a second planar portion that covers the rear surface, a third planar portion that extends between the first and second planar portions and covers the side surface, and a fourth portion that extends between the first and second planar portions of the flexible touch sensor layer opposite the third planar portion of the touch sensor layer, wherein the flexible display layer and the flexible touch sensor layer define openings at the first and second opposing ends;
    a first housing portion that covers the opening at the first end; and
    a second housing portion that covers the opening at the second end, wherein the second housing portion comprises a microphone port.

12. The electronic device defined in claim 11, wherein the side surface is substantially perpendicular to the front and rear surfaces.

13. The electronic device defined in claim 11, wherein the electronic device comprises a rounded surface between the front surface and the side surface, and wherein the flexible display layer comprises a rounded portion that extends between the first planar portion and the third planar portion and covers the rounded surface of the electronic device.

14. An electronic device having first and second opposing ends, the electronic device comprising:
   a transparent cover structure having a planar front portion, a planar rear portion opposite the planar front portion, a curved side portion that curves continuously from the planar front portion to the planar rear portion, and openings at the first and second opposing ends;
   a flexible display that emits light through the planar front portion and the curved side portion of the transparent cover structure;
   a touch sensor array formed on the planar rear portion of the transparent cover structure; and
   housing structures that cover the openings at the first and second opposing ends, wherein the housing structures comprise a speaker port.

15. The electronic device defined in claim 14, wherein the flexible display emits light through the planar rear portion of the transparent cover structure.

16. The electronic device defined in claim 14, wherein the touch sensor array is formed on the curved side portion of the transparent cover structure.

17. The electronic device defined in claim 16, wherein the touch sensor array is formed on the planar front portion of the transparent cover structure.

18. An electronic device, comprising:
   a transparent cover structure having a planar front portion, a planar rear portion, and a curved side portion that extends from the planar front portion to the planar rear portion;
   a flexible display that emits light through the planar front portion and the curved side portion of the transparent cover structure;
   a touch sensor array formed on the planar rear portion of the transparent cover structure, wherein the transparent cover structure forms openings at first and second opposing ends of the electronic device; and
   end caps that cover the openings at the first and second opposing ends of the electronic device.

19. The electronic device defined in claim 18, wherein at least one of the end caps comprises an audio jack port.

* * * * *